United States Patent
Schertler

(10) Patent No.: US 9,569,668 B2
(45) Date of Patent: Feb. 14, 2017

(54) METHOD AND DEVICE FOR IMAGE-ASSISTED RUNWAY LOCALIZATION

(71) Applicant: Airbus Defence and Space GmbH, Ottobrunn (DE)

(72) Inventor: Klaus Schertler, Garching (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/443,003

(22) PCT Filed: Oct. 22, 2013

(86) PCT No.: PCT/DE2013/100362
§ 371 (c)(1),
(2) Date: May 14, 2015

(87) PCT Pub. No.: WO2014/075657
PCT Pub. Date: May 22, 2014

(65) Prior Publication Data
US 2015/0310277 A1    Oct. 29, 2015

(30) Foreign Application Priority Data
Nov. 15, 2012   (DE) .................. 10 2012 111 010

(51) Int. Cl.
*G06K 9/00*    (2006.01)
*G06T 7/00*    (2006.01)
(Continued)

(52) U.S. Cl.
CPC ......... *G06K 9/00651* (2013.01); *G06K 9/0063* (2013.01); *G06K 9/4604* (2013.01);
(Continued)

(58) Field of Classification Search
CPC   G06K 9/0063; G06K 9/00651; G06K 9/4604; G06K 9/52; G06K 9/6201; G06T 2207/10032; G06T 2207/30256; G06T 7/0042
(Continued)

(56) References Cited

U.S. PATENT DOCUMENTS 5,097,329 A * 3/1992 Hasegawa ............ G05D 1/0246
                                                    348/143
7,437,244 B2 * 10/2008 Okada ..................... G08G 1/166
                                                    348/155
(Continued)

FOREIGN PATENT DOCUMENTS

DE    102010047051 A1    3/2012

OTHER PUBLICATIONS

Forsyth & Ponce, "Computer Vision—A Modern Approach", Pearson Education; ISBN 0-13-191193-7.
(Continued)

*Primary Examiner* — Tom Y Lu
(74) *Attorney, Agent, or Firm* — Hoffmann & Baron, LLP

(57) ABSTRACT

A method and a device for runway localization on the basis of a feature analysis of at least one image of the runway surroundings taken by a landing aircraft is characterized in that, in order to determine the central axis of the runway, feature matching between image features of the image and mirrored image features of the image is carried out, wherein features of the one runway side are made to be congruent with features of the other runway side.

14 Claims, 5 Drawing Sheets

(51) Int. Cl.
*G06K 9/46* (2006.01)
*G06K 9/52* (2006.01)
*G06K 9/62* (2006.01)

(52) U.S. Cl.
CPC ............. *G06K 9/52* (2013.01); *G06K 9/6201* (2013.01); *G06T 7/0042* (2013.01); *G06T 2207/10032* (2013.01); *G06T 2207/30256* (2013.01)

(58) Field of Classification Search
USPC ................ 382/104, 254, 260, 276, 278, 296
See application file for complete search history.

(56) References Cited

U.S. PATENT DOCUMENTS

| 8,717,581 B2 | 5/2014 | Laengle |
| 2009/0066490 A1 | 3/2009 | Mitzutani et al. |

OTHER PUBLICATIONS

Richard Woods, et al., "Digital Image Processing", Prentice Hall; ISBN 978-0-13-168728-8.

Ylae-Laeaeski, A. et al., "Grouping Symmetrical Structures for Object Segmentation and Description", Computer Vision and Image Understanding, Academic Press, US, vol. 63, No. 3, May 1, 1996, pp. 399-417.

Regensburger, U, et al., "Visual Recognition of Obstacles on Roads", Proceedings of the IEEE/RSJ/GI International Conference on Intelligent Robots and Systems: Advanced Robotics and the Real World, Munich, Sep. 12-16, 1994, vol. 2, Sep. 12, 1994, pp. 980-987.

Dicmanns, E.D., "Bifocal vision for mobile robot control", Industrial Electronics, 1993, Conference Proceedings, ISIE '93, Budape St., IEEE International Symposium on Budapest, Hungary, Jun. 1-3, 1993, New York, NY, USA, IEEE, US, Jun. 1, 1993, pp. 243-248.

Gong, X, et al., "A survey of techniques for detection and tracking of airport runways", Collection of Technical Papers—44th AIAA Aerospace Sciences Meeting Collection of Technical Papers—44th AIAA Aerospace Sciences Meeting 2006 American Institute of Aeronautics and Astronautics Inc., US, vol. 23, No. 44th, Jan. 9, 2006, pp. 17289-17302.

Baumbach, T., et al., "Symmetriedetektion—eine robuste, signalbasierte Methode", Proc. 22th DAGM Symposium, Kiel, Germany, Sep. 13-15, 2000, pp. 155-162, Mustererkennung 2000, Springer-Verlag.

\* cited by examiner

METHOD AND DEVICE FOR IMAGE-ASSISTED RUNWAY LOCALIZATION

CROSS-REFERENCE TO RELATED APPLICATIONS

This application is the U.S. National Phase of, and Applicant claims priority from, International Application No. PCT/DE2013/100362, filed 22 Oct. 2013, and German Patent Application No. DE 102012111010.7, filed 15 Nov. 2012, both of which are incorporated herein by reference in their entirety.

BACKGROUND

The invention concerns a method and a device for runway localization on the basis of a feature analysis of at least one image of the runway surroundings taken by a landing aircraft.

For the localization of runways in images, one usually uses feature-based methods or template-based methods of image processing, see X. Gong, A.L. Abbott, "A Survey of Techniques for Detection and Tracking of Airport Runways", 44$^{th}$ AIAA Aerospace Sciences Meeting and Exhibit, 9-12 January 2006, Reno, Nev. In these methods, features and templates of the specific visual components of the runways and possibly their surroundings such as boundary features, boundary markings, center lines, thresholds, runway identifiers, runway beacons or target markings are entered as model knowledge in feature and template databases. Through feature matching or template matching of the features or templates contained in the camera image with the model knowledge entered into the database, a resulting general situation of the runway can be determined in the image.

For example, in the domain of the feature-based methods, the dominant line features of the runway markings are often extracted and utilized by using so-called Hough transforms. The extracted line features are then compared with the model knowledge saved in the database as to the situation of runway boundaries, center lines or edges of thresholds and a general situation of the runway is determined in the image. The known feature and template-based methods which rely on the recognition and localization of specific visual components of the runway have various technical drawbacks, however.

On the one hand, the described feature and template matching involves a large computing expense in the aircraft. The high computing expense should be viewed especially against the background of the high demands on aviation-suitable computing hardware. These demands greatly restrict the available computing power in the aircraft—as compared to the computing power of commercial computing hardware. Furthermore, other disadvantages result from the need to use specific model knowledge. The recognition of specific visual components of the runway demands model knowledge available in the aircraft, for example stored in databases, on the visual components to be anticipated on different runways under different conditions. This model knowledge encompasses the specific appearances of the components, such as shapes and colors and their relative situations to each other. The model knowledge has to be checked continually for its validity and possibly adapted. This is necessary even without active structural changes to the runways. For example, over the course of time the center lines are increasingly covered over by tire abrasion in the area of the touchdown points of runways. The present visibility of individual components must therefore be current when included in the model knowledge. Since, furthermore, the model knowledge to be used is dependent on the time of day and the weather, a selection must be made of the presently used model knowledge in every landing approach. For example, models should be used at night or at twilight which allow for the visual features of the runway beacons. But these should also be used during the day if, for example, white markings can no longer be reliably recognized due to snowfall.

Even despite a selection of the model knowledge depending on the surroundings, additional hard to detect variations may occur in the appearances of the visual components, for example due to rain, fog, or cloud shadows. These visual variations can greatly affect the accuracy and reliability of the methods.

Therefore, traditional methods based on the recognition and localization of specific visual components of the runways require a time-consuming and costly creation, maintenance, availability and selection of model knowledge in the aircraft. Landing approaches to runways for which no model knowledge is available cannot be done in an image-assisted manner. Unavoidable variations in the appearances of the visual components can have great negative impact on the accuracy and reliability of the methods. Furthermore, the known methods involve a high demand for computing power, which requires an increased technical expense, especially in the airplane.

SUMMARY

Starting from this, the invention proposes to solve the problem of making possible a determination of the situation of a runway based on an image with little computing expense, even when no model knowledge is available on specific visual components of the runway or its surroundings.

The invention emerges from the features of the independent claims. Advantageous modifications and embodiments are the subject matter of the dependent claims. Other features, possible applications and benefits of the invention will emerge from the following specification, as well as the discussion of sample embodiments of the invention, which are shown in the figures.

According to the invention, the problem is solved in that, in order to determine the central axis of the runway, feature matching between image features of the camera image and mirrored image features of the image is carried out, wherein features of the one runway side are made to be congruent with features of the other runway side, and wherein the maximum similarity of the two images is attained when the mirror axis, as the center axis of the runway, lies in the center of the runway.

The solution according to the invention consists in using the property that nearly all dominant visual components of the runway (boundary markings, center lines, thresholds, runway beacons or target point markings) are arranged with mirror symmetry relative to the runway center. Instead of localizing the visual components present in the image by a feature or template matching with the features or templates contained in a database, according to the invention a feature matching is carried out between the image features and their mirrored version. In this way, for example, mirrored visual features of components of the left half of the runway are made to be congruent with the corresponding components of the right half of the runway, and vice versa. The maximum similarity in the feature matching is achieved when the mirror axis used for the mirroring of the image features lies at the center of the runway—which ultimately defines the position of the runway. Since visual variations in the image, such as lighting changes or fog, generally do not occur dominantly at one of the two halves of the runway, the situation of the mirror axis—and thus the situation of the runway—is thus very robust to visual variations.

According to one advantageous modification of the invention, the image is converted into a horizontally oriented image, preferably by determining the position of the horizon from the camera image or from the sensors of the aircraft.

According to yet another advantageous modification of the invention, each time from the image or the horizontally oriented image a feature image and a mirrored feature image is generated by a feature extraction.

According to yet another advantageous modification of the invention, the feature extraction is done by determining the horizontal edge thickness in the image. The determination of the edge thickness as a feature is especially advantageous, particularly due to relatively thick edges at the margins of the runway markings.

According to yet another advantageous modification of the invention, the determination of the horizontal edge thickness in the image is done by means of convolution of the respective image with a horizontal filter mask of form [−1, 0, 1] and subsequent generation of the amplitude of the filter response. Such a determination of the edge thickness advantageously comes with a low computing expense and therefore short computation time.

According to yet another advantageous modification of the invention, to produce a feature matching image one forms a correlation between individual corresponding lines in the feature image of the image and the mirrored feature image of the image.

According to yet another advantageous modification of the invention, the correlation is done by the following relation:

$$V(k)=IFFT(FFT(M1(k))*CONJ(FFT(M2(k)))), \text{ with}$$

FFT: the fast Fourier transform;
IFFT: the inverse fast Fourier transform
M1: the feature image
M2: the mirrored feature image
M1(k) and M2(k): the k-th lines of the feature images
CONJ: complex conjugation.

V(k) contains a maximum correlation value at the position where a mirroring of the features has maximum similarity to the non-mirrored features.

According to yet another advantageous modification of the invention, the correlation is carried out for all lines or only a subset of lines or only for a definite region in the images. If the computation is carried out only with a subset of lines, such as only every second or every third line, the computing expense is reduced and with it the time needed until the result is available.

According to yet another advantageous modification of the invention, in each computed line of the feature matching image one or more horizontal image positions of local correlation maximum values are determined, containing the image position of the global line maximum, and these image positions are approximated as position hypotheses by a straight line representing the runway center axis.

Preferably one determines as the runway center axis the straight line which is confirmed by a maximum total number of position hypotheses.

Preferably, the runway center axis ascertained in this way is extrapolated back to the original image (not horizontally oriented) to put out the actual runway center axis in the photographed image.

The problem moreover is solved by a device for runway localization based on a feature analysis of at least one image of the runway surroundings taken by a landing aircraft, characterized in that it comprises
  a camera unit for taking pictures of a runway;
  an image orienting unit for generating a horizontally oriented camera image;
  a feature extraction unit for generating a feature image and a mirrored feature image from the image;
  an axis of symmetry determining unit, which generates a feature matching image on the basis of the feature images;
  a straight line determining unit, which determines the runway center axis from the feature matching image.

Preferably the feature extraction unit is designed for the determination of horizontal edge thicknesses by convolution of the image with a horizontal filter mask of form [−1, 0, 1] and subsequent generating of the filter response amplitude.

Further benefits, features and details will emerge from the following description, in which at least one sample embodiment is described in detail—possibly with reference to the drawing. Features described and/or depicted constitute by themselves or in any given combination the subject matter of the invention and can be in particular additionally the subject matter of one or more separate applications. The same, similar and/or functionally identical parts are provided with the same reference numbers.

BRIEF DESCRIPTION OF THE DRAWINGS

There are shown.

DETAILED DESCRIPTION

Figure 1:
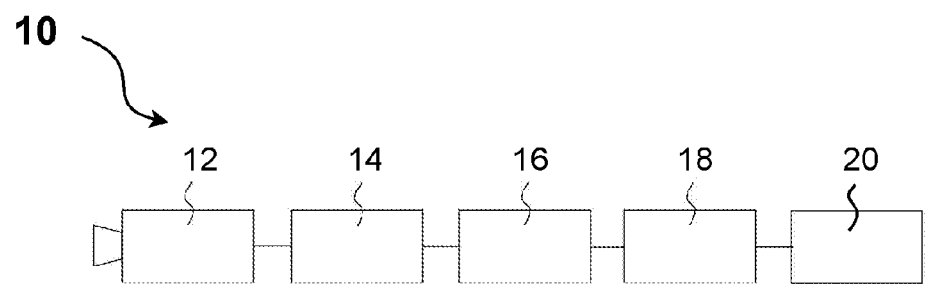
FIG. 1: an overview of the system.

FIG. 1 shows an overview of the system of the invented device 10 comprising a camera unit 12, an orienting unit 14, a feature extraction unit 16, an axis of symmetry determining unit 18 and a straight line determining unit 20.

Figure 2:
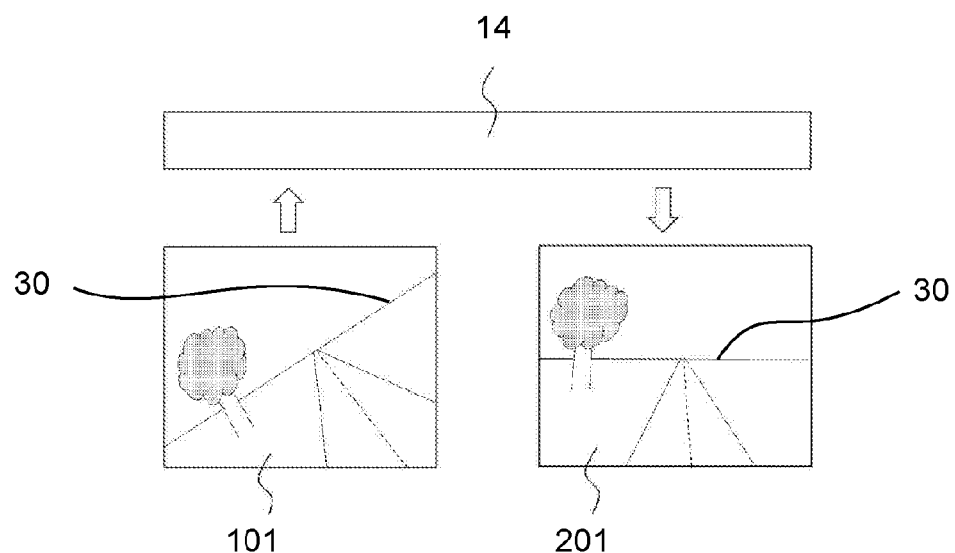
FIG. 2: the mode of operation of the orienting unit.

FIG. 2 shows the mode of operation of the orienting unit 14. The camera image 101 is converted into a horizontally oriented camera image 201. The orienting unit 14 by rotation of the camera image 101 converts it into a horizontally oriented camera image 201. The information about the angle of rotation needed for this is taken either from the sensors of the aircraft or alternatively from the camera image 101 itself, e.g., by determining the position of the horizon 30. The oriented camera image 201 is taken to the feature extraction unit 16 discussed in FIG. 3.

Figure 3:
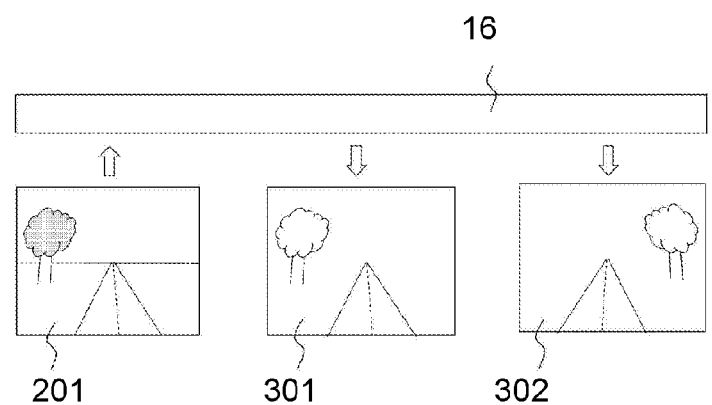
FIG. 3: the mode of operation of the feature extraction unit.

FIG. 3 illustrates the mode of operation of the feature extraction unit 16. In this unit, the oriented camera image 201 is converted into a feature image 301 and a mirrored feature image 302. The second feature image 302 contains the horizontally mirrored features of the feature image 301.

One embodiment of the feature extraction is by determining the amplitude of the horizontal edge thickness. The feature image 301 in this case is obtained by convolution of the camera image with a horizontal edge filter mask of form [−1, 0, 1] and subsequent generating of the filter response amplitude. Such a method is described in R.C. Gonzales, R.E. Woods, "Digital Image Processing", Prentice Hall International, 2007. The result of the amplitude generation gives the feature image 301. A mirrored feature image 302 is obtained by horizontal mirroring of the feature image 301 at its center, see FIG. 3. The mirroring corresponds to a reversing of the sequence of columns in the feature image.

The feature images 301 and 302 are taken to the axis of symmetry determining unit 18.

Figure 4A:
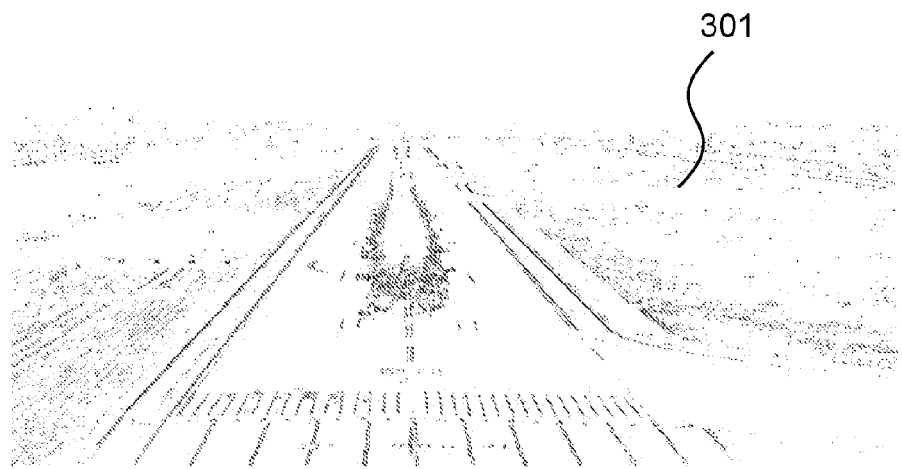
FIGS. 4a and 4b: two feature images of a runway during the day, obtained by the design of the feature extraction unit.
Figure 4B:
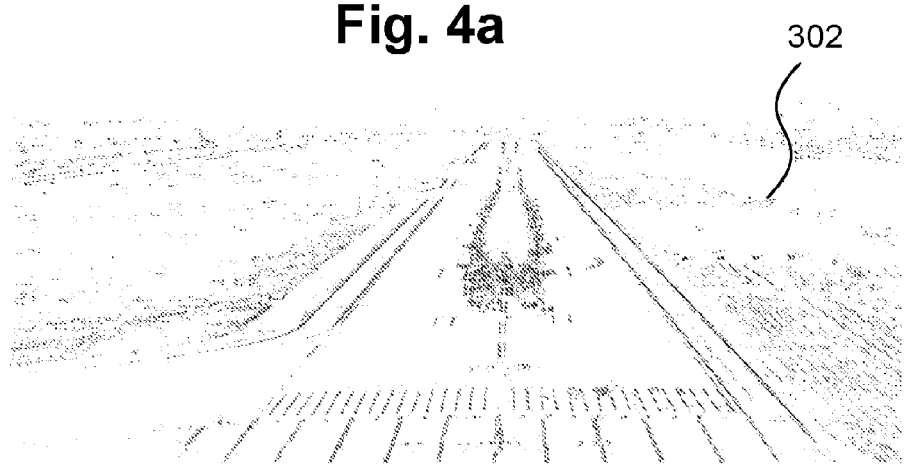

FIGS. 4a and 4b show the feature images 301 and 302 of a runway during the day, obtained by the embodiment of the feature extraction unit 16. In the central region of the images, the center lines of the runway are covered over by tire abrasion.

Figure 5A:
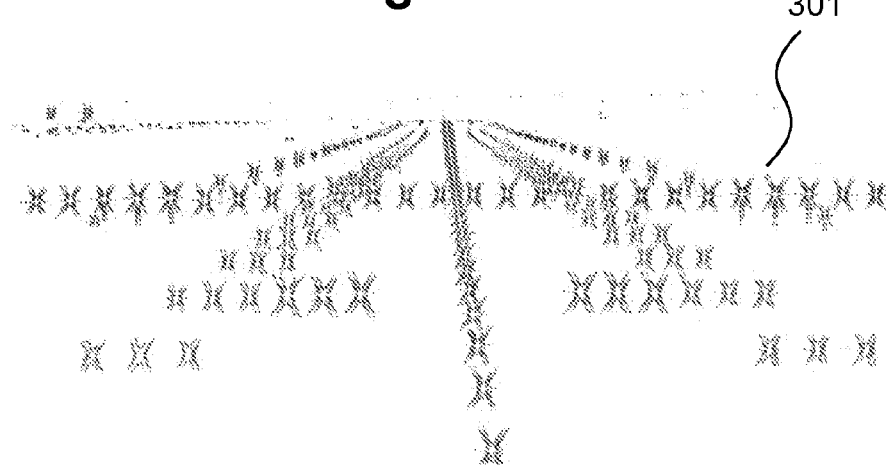
FIGS. 5a and 5b: two feature images of a runway at night, obtained by the design of the feature extraction unit.
Figure 5B:
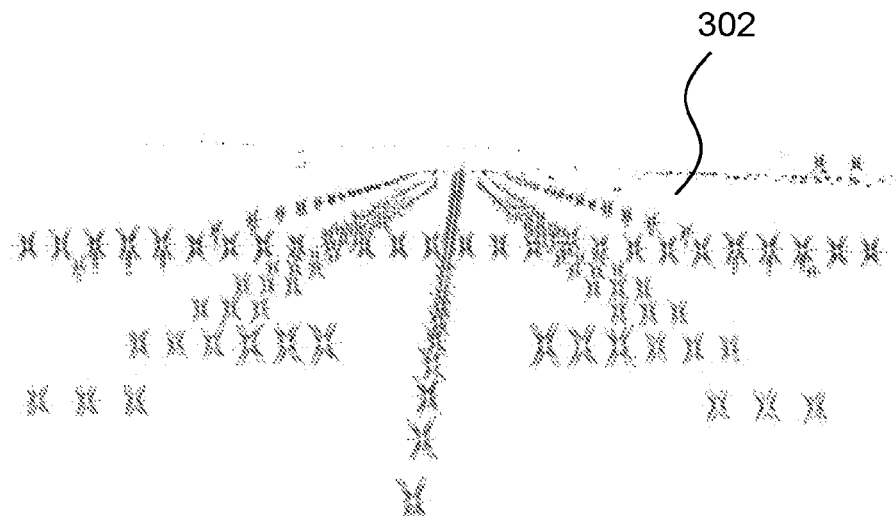

FIGS. 5a and 5b show the feature images 301 and 302 of a runway at night, obtained by the embodiment of the feature extraction unit 16. The cross-shaped structures are produced by the light sources of the runway beacons.

Figure 6:
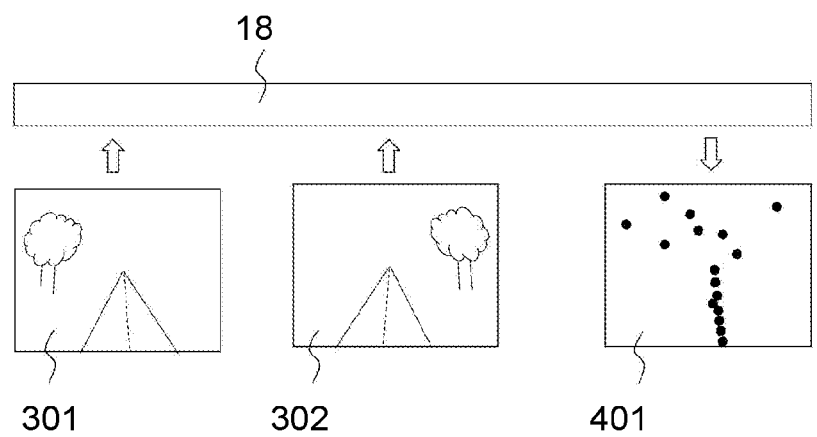
FIG. 6: the mode of operation of the axis of symmetry determining unit.

FIG. 6 illustrates the mode of operation of the axis of symmetry determining unit 18. In this unit, correlations are formed line by line between corresponding lines of the feature images 301 and 302 to generate a feature matching image 401. The maxima in the feature matching image correspond to the positions of maximum horizontal mirror symmetry in the feature image 301, see FIG. 7.

One embodiment for determining the k-th line V(k) of the feature matching image V is given by the following expressing for calculating the correlation in the frequency realm, see the above citation of Gonzales et al:

$$V(k)=\text{IFFT}(\text{FFT}(M1(k))*\text{CONJ}(\text{FFT}(M2(k))))$$

Here, M1(k) and M2(k) are the k-th lines of the feature images 301 and 302. The fast Fourier transform is given by the symbol FFT and its inverse transform by the symbol IFFT. CONJ represents complex conjugation.

V(k) contains a maximum correlation value at the position where a mirroring of the features has maximum similarity with the non-mirrored features.

Figure 7:
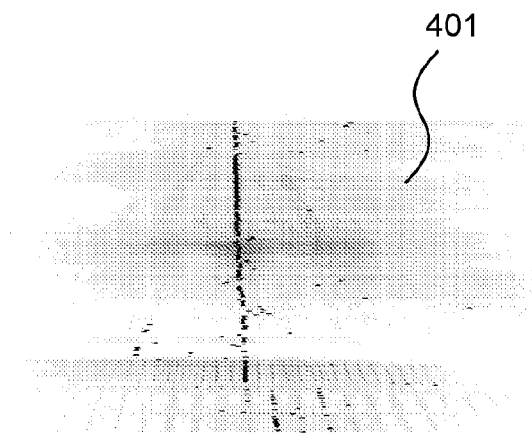
FIG. 7: a result of the axis of symmetry determining unit in the form of the feature matching image of the runway during the day from FIGS. 4a and 4b.

FIG. 7 shows a result of the axis of symmetry determining unit 18 in the form of the feature matching image 401 of the runway by day from FIG. 4. Line maxima in the feature matching image are shown as thicker black points.

Figure 8:
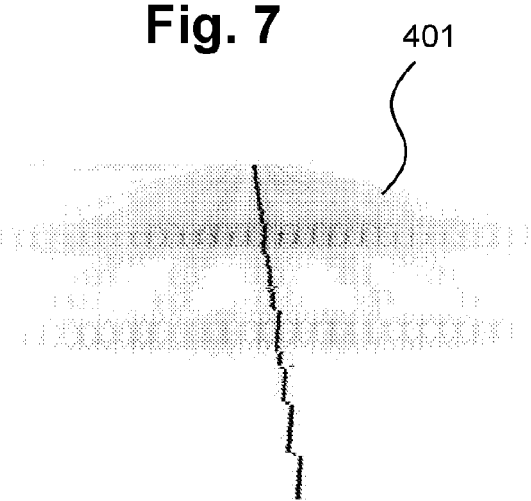
FIG. 8: a result of the axis of symmetry determining unit in the form of the feature matching image of the runway at night from FIGS. 5a and 5b.

FIG. 8 shows a result of the axis of symmetry determining unit 18 in the form of the feature matching image 401 of the runway at night from FIGS. 5a and 5b. Line maxima in the feature matching image are shown as thicker black points.

An alternative embodiment calculates the feature matching image only on a suitably selected subset of lines, for example, at discrete line jumps, or only in a relevant region of the feature image.

Figure 9:
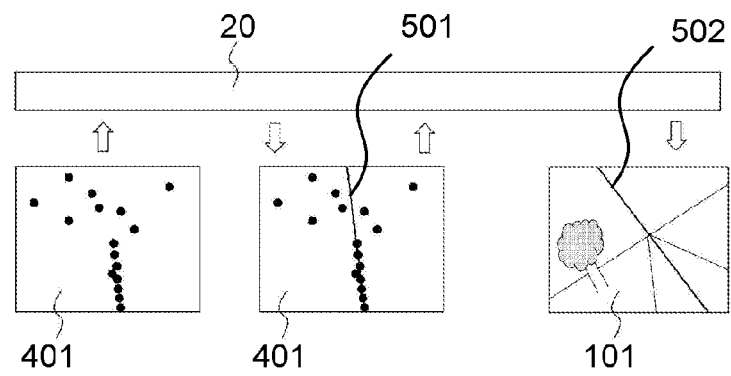
FIG. 9: the mode of operation of the straight line determining unit.

The feature matching image 401 is taken to the straight line determining unit 20. FIG. 9 illustrates the mode of operation of the straight line determining unit 20. In this unit, the dominant line 501 is determined along the maxima of the feature matching image 401. The line 501 corresponds to the position of the runway in the oriented camera image 201. By inverting the rotation performed in the orienting unit 14, the line 501 is converted into the line 502. This corresponds to the position of the runway in the camera image 101.

In particular, the horizontal image position of the maximum value is determined for each line k of the feature matching image 401 calculated in the straight line determining unit 20, see FIGS. 7 and 8. The positions of the correlation maxima obtained in this way are interpreted as hypotheses for the position of the runway center in the oriented camera image 201. The task of the straight line determining unit 20 is now to draw a straight line 501 through the positions of the correlation maxima and determine its line parameters. See FIG. 9.

One embodiment of the straight line determination is the method of "Random Sample Consensus" (RANSAC) as described in D.A. Forsyth, J. Ponce, "Computer Vision", Pearson Education, 2003. In this, two position hypotheses are randomly selected until the resulting straight line is confirmed by a sufficiently large number of other position hypotheses.

As the final step, the straight line parameters of the line 501 corresponding to the angle of rotation used in the orienting unit 14 are extrapolated from their representation in the oriented camera image 201 back to the representation in the original camera image 101. The line 502 so obtained constitutes the sought position of the runway in the camera image.

Figure 10:
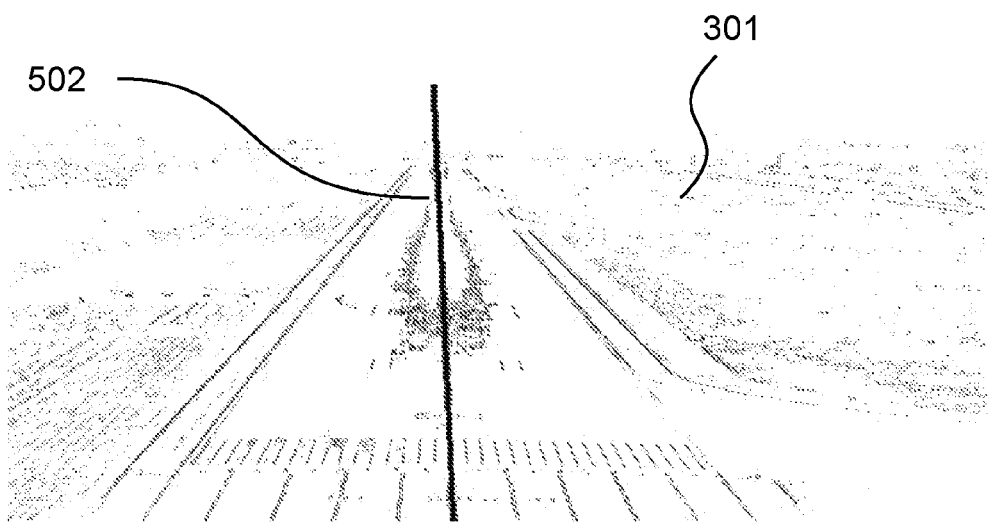
FIG. 10: the result of the straight line determining unit for the image per FIG. 4.

FIG. 10 shows the result of the straight line determining unit 20. The line 502 corresponds to the position of the runway by day from FIGS. 4a and 4b.

Figure 11:
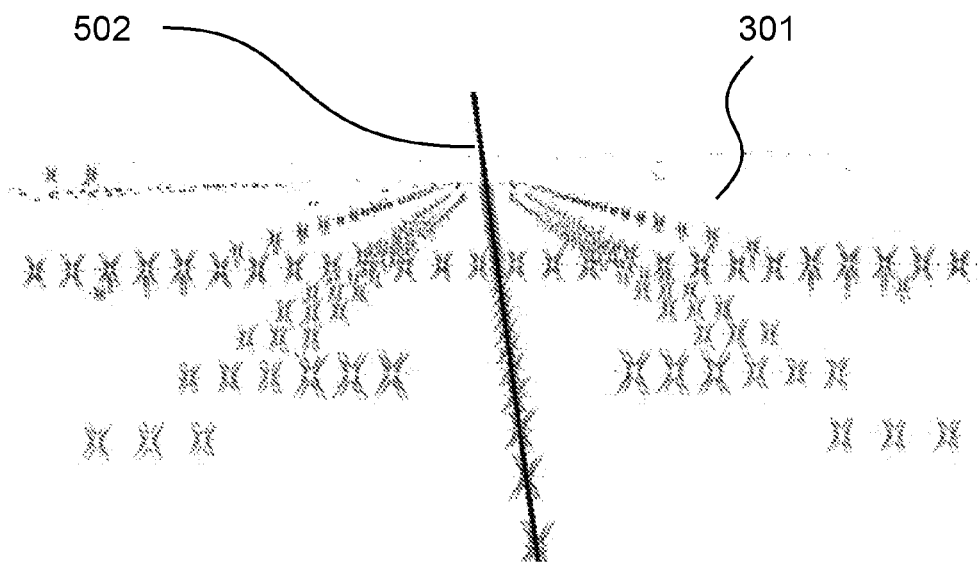
FIG. 11: the result of the straight line determining unit for the image per FIG. 5.

FIG. 11 shows the result of the straight line determining unit 20. The line 502 corresponds to the position of the runway at night from FIGS. 5a and 5b.

An alternative embodiment of the straight line determining unit 20 uses several local maximum values per line of the feature matching image 401 as position hypotheses.

The invention claimed is:

1. A method of localizing a runway based on feature analysis of an image including the runway, the method comprising:

rotating the image to a horizontally-oriented image according to an angle of rotation;

generating a feature image comprising image features of the horizontally-oriented image and a mirrored feature image of the feature image comprising mirrored image features of the horizontally-oriented image;

generating a feature matching image having a plurality of lines, each line of the plurality of lines in the feature matching image indicating a line maximum according to a correlation between image features and mirrored image features in individual corresponding lines of the feature image and the mirrored feature image, the line maximum for each line in the feature matching image given as:

$$V(k)=\text{IFFT}(\text{FFT}(M1(k))*\text{CONJ}(\text{FFT}(M2(k)))), \text{ with}$$

FFT: fast Fourier transform;
IFFT: inverse fast Fourier transform;
M1: the feature image;
M2: the mirrored feature image;

M1(k): k-th line of the feature image;
M2(k): k-th line of the mirrored feature image; and
CONJ: complex conjugation.

2. The method according to claim 1, wherein the method further comprises carrying out the correlation for all lines, or only a subset of all lines, or only for a definite region in the feature image and the mirrored feature image.

3. The method according to claim 1, wherein the method further comprises:
determining a plurality of image positions in the feature matching image, each image position corresponding to the line maximum in each individual line of the plurality of lines in the feature matching image; and
approximating the plurality of image positions as position hypotheses by a straight line, the straight line representing a center axis of the runway.

4. The method according to claim 3, wherein the method further comprises confirming the straight line as the center axis of the runway by a maximum total number of position hypotheses.

5. The method according to claim 3, wherein the method further comprises extrapolating the center axis to the image that includes the runway as the center axis of the runway.

6. A system to localize a runway based on feature analysis of an image including the runway, the system comprising:
a computing device;
a storage device storing instructions that, when executed by the computing device, cause the computing device to perform operations comprising:
rotating the image to a horizontally-oriented image according to angle of rotation;
generating a feature image comprising image features of the horizontally-oriented image and a mirrored feature image of the feature image comprising mirrored image features of the horizontally-oriented image; and
generating a feature matching image having a plurality of lines, each line of the plurality of lines in the feature matching image indicating a line maximum according to a correlation between image features and mirrored image features in individual corresponding lines of the feature image and the mirrored feature image, the line maximum for each line in the feature matching image given as:

$V(k)=\text{IFFT}(\text{FFT}(M1(k)) * \text{CONJ}(\text{FFT}(M2(k))))$, with

FFT: fast Fourier transform;
IFFT: inverse fast Fourier transform;
M1: the feature image;
M2: the mirrored feature image;
M1(k): k-th line of the feature image;
M2(k): k-th line mirrored feature image; and
CONJ: complex conjugation.

7. The system according to claim 6, wherein the operations for generating the feature image comprise:
performing convolution of the image with a horizontal filter mask of form [−1, 0, 1]; and
generating a filter response amplitude.

8. The method according to claim 1, wherein generation of the feature image comprises:
performing convolution of the image with a horizontal filter mask of form [−1, 0, 1]; and
generating a filter response amplitude.

9. The system according to claim 6, wherein the operations further comprise carrying out the correlation for all lines, or only a subset of all lines, or only for a definite region in the feature image and the mirrored feature image.

10. The system according to claim 6, wherein the operations further comprise:
determining a plurality of image positions in the feature matching image, each image position corresponding to the line maximum in each individual line of the plurality of lines in the feature matching image; and
approximating the plurality of image positions as position hypotheses by a straight line, the straight line representing a center axis of the runway.

11. The system according to claim 10, wherein the operations further comprise confirming the straight line as the center axis of the runway by a maximum total number of position hypotheses.

12. The system according to claim 10, wherein the operations further comprise extrapolating the center axis to the image that includes the runway as the center axis of the runway.

13. The system according to claim 12, wherein the operations for extrapolation of the center axis of the runway further comprise rotating the straight line according to the angle of rotation.

14. The method according to claim 5, wherein extrapolation of the center axis of the runway further comprises rotating the straight line according to the angle of rotation.

* * * * *